Jan. 5, 1926.

L. M. PERKINS

GENERATOR

Filed Jan. 3, 1921

1,568,237

Patented Jan. 5, 1926.

1,568,237

UNITED STATES PATENT OFFICE.

LAURENCE M. PERKINS, OF SYRACUSE, NEW YORK.

GENERATOR.

Application filed January 3, 1921. Serial No. 434,528.

*To all whom it may concern:*

Be it known that I, LAURENCE M. PERKINS, a citizen of the United States, and a resident of Syracuse, in the county of Onondaga, in the State of New York, have invented new and useful Improvements in Generators, of which the following, taken in connection with the accompanying drawings, is a full, clear, and exact description.

This invention relates to certain improvements in variable speed generators, with special reference to third brush generators, and is an improvement for certain purposes upon the disclosure of my copending application Serial No. 418,181, filed October 20, 1920, upon generators.

The generator here disclosed has substantially the advantages of the generator of my said co-pending application with the added feature that whereas the output characteristic curve of the machine of my co-pending application is substantially fixed in shape, the construction of the present generator provides the possibility of changing to a certain extent the characteristic curve to meet particular conditions, as for instance, to increase the ampere output under higher motor speed as compared with the generator of the said co-pending application.

Figure 1:
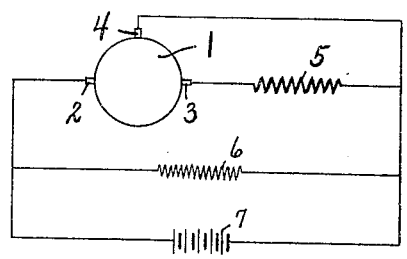
Figure 2:
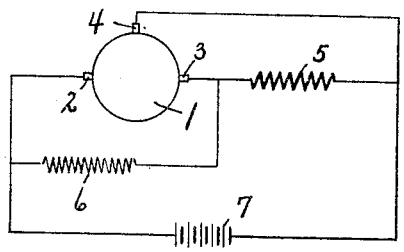

Figures 1 and 2 are diagrammatic views of different embodiments of my invention.

As shown in the said figures, the generator comprises an armature —1—, provided with brushes —2— —3— and —4—, the brush —2— being set practically on neutral while brush —4— is set less than 180 electrical degrees from brush —2—, the angular position of brush —4— being determined somewhat by the generator design and the desired output. The brush —3— is placed at or near the other neutral point opposite brush —2—.

However, it may be noted that the brush —4— in this construction of machine may be placed in such position in the field form that the field density at that point is relatively low instead of being placed in the maximum field density, as is the case with the third brush in the normal third brush machine.

The load or power circuit is connected between brushes —2— and —4—, as will be clearly evident from the drawings.

A field winding —5— is provided, which winding is energized from the armature through brushes —3— and —4—. In combination with the machine so far described, I have illustrated an additional field —6— shown in Figure 1, as connected in shunt across the load or battery —7—, and shown in Figure 2 as connected in shunt across the brushes —2— and —3— on neutral.

In the new combination here disclosed, the field —5— may be so designed that at the higher speed with brush —2— positive, the brush —4— may become negative with respect to the brush —3—, causing the current in field —5— to reverse, although the combined strength of the two fields —5— and —6— must never reverse.

Although with the construction of Figure 2 the current may be slightly less at high speed than with the construction of Figure 1, yet because of the relatively low resistance of the field —5— there will be a little difference in operation between the two disclosures, the one being the substantial equivalent of the other for the purpose of the claims of this application.

As before suggested, the use of the shunt field —6— permits and accomplishes the changing to a certain extent of the shape of the output characteristic curve of the heretofore known third brush machine.

I claim:

1. The combination with a variable speed constant potential generator in which the load is taken off two brushes, one of which is practically on neutral and the other of which is off neutral to such an extent that the angle between the two brushes is less than 180 electrical degrees, and a third brush substantially on the other neutral point, a shunt field connected between the brush which is off neutral and said third brush, of a second shunt field winding connected directly across the load.

2. The combination with a variable speed generator in which the load is taken off two brushes, one of which is practically on neutral and the other of which is off neutral to such an extent that the angle between the two brushes is less than 150 electrical degrees and more than 60 electrical degrees, and a third brush substantially on the other neutral point, a shunt field connected between the brush which is off neutral and said third brush, of a second shunt field winding connected directly across the load.

3. The combination with a variable speed generator in which the load is connected to two brushes one of which is substantially on neutral and the other of which is off neutral to such an extent that the angle between the two brushes is less than 180 electrical degrees, of a brush positioned substantially on the other neutral point, a field connected between the brush which is off neutral and said last named brush, and a shunt field winding connected directly across the load.

In witness whereof I have hereunto set my hand this 24th day of December, 1920.

LAURENCE M. PERKINS.